United States Patent
Osawa et al.

(10) Patent No.: US 12,082,083 B2
(45) Date of Patent: Sep. 3, 2024

(54) TERMINAL AND COMMUNICATION METHOD FOR INTER-DEVICE DIRECT COMMUNICATION

(71) Applicant: NTT DOCOMO, INC., Tokyo (JP)

(72) Inventors: Ryosuke Osawa, Tokyo (JP); Huan Wang, Haidian District (CN); Xiaolin Hou, Haidian District (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/265,365

(22) PCT Filed: Aug. 9, 2018

(86) PCT No.: PCT/JP2018/029986
§ 371 (c)(1),
(2) Date: Feb. 2, 2021

(87) PCT Pub. No.: WO2020/031348
PCT Pub. Date: Feb. 13, 2020

(65) Prior Publication Data
US 2021/0297830 A1  Sep. 23, 2021

(51) Int. Cl.
H04W 4/40 (2018.01)
H04W 72/044 (2023.01)
H04W 72/30 (2023.01)
H04W 76/11 (2018.01)

(52) U.S. Cl.
CPC ......... *H04W 4/40* (2018.02); *H04W 72/0466* (2013.01); *H04W 72/30* (2023.01); *H04W 76/11* (2018.02)

(58) Field of Classification Search
CPC ....... H04W 4/40; H04W 76/11; H04W 72/30; H04W 72/0466
See application file for complete search history.

(56) References Cited

U.S. PATENT DOCUMENTS

| | | | |
|---|---|---|---|
| 2015/0043545 A1* | 2/2015 | Cheng | H04L 27/26136 370/336 |
| 2016/0234045 A1* | 8/2016 | Lindoff | H04L 25/03866 |
| 2016/0249355 A1 | 8/2016 | Chae et al. | |
| 2016/0255647 A1 | 9/2016 | Zhu et al. | |
| 2016/0344782 A1* | 11/2016 | Cheng | H04W 76/14 |
| 2018/0035435 A1* | 2/2018 | Gupta | H04L 5/0055 |

(Continued)

FOREIGN PATENT DOCUMENTS

| | | | |
|---|---|---|---|
| JP | 2016-532334 A | 10/2016 | |
| JP | 2017-501610 A | 1/2017 | |

(Continued)

OTHER PUBLICATIONS

International Search Report issued in Application No. PCT/JP2018/029986, mailed on Oct. 30, 2018 (5 pages).

(Continued)

*Primary Examiner* — Won Tae C Kim
(74) *Attorney, Agent, or Firm* — Osha Bergman Watanabe & Burton LLP

(57) ABSTRACT

A user equipment includes a reception unit that receives control information and data through inter-terminal direct communication; and a control unit that determines, based on the control information or the data, whether the inter-terminal direct communication is unicast, groupcast, or broadcast.

3 Claims, 7 Drawing Sheets

- SCI SCRAMBLING SEQUENCE IS INDEPENDENT FROM TRANSMISSION TYPE
- TRANSMISSION TYPE IS REPORTED BY SCI OR DIFFERENT SCI FORMATS ARE ASSOCIATED WITH DIFFERENT TRANSMISSION TYPES

DATA SCRAMBLING SEQUENCE
UNICAST: DERIVED BASED ON UE ID/RNTI
GROUPCAST: DERIVED BASED ON Group ID/RNTI
BROADCAST: SPECIFIED IN ADVANCE OR CONFIGURED INDEPENDENTLY FROM UE/Group ID/RNTI

(56) References Cited

U.S. PATENT DOCUMENTS

| | | | |
|---|---|---|---|
| 2018/0054693 A1* | 2/2018 | Agiwal | H04W 4/70 |
| 2019/0044579 A1* | 2/2019 | Bengtsson | H04B 7/0404 |
| 2021/0152272 A1* | 5/2021 | Kimura | H04L 27/26025 |
| 2021/0204250 A1* | 7/2021 | Ashraf | H04W 72/56 |
| 2021/0289473 A1 | 9/2021 | Chae et al. | |

FOREIGN PATENT DOCUMENTS

| | | | |
|---|---|---|---|
| WO | 2015/076867 A1 | 5/2015 | |
| WO | 2016/072631 A1 | 5/2016 | |
| WO | 2018/030854 A1 | 2/2018 | |
| WO | WO-2019195505 A1 * | 10/2019 | H04L 1/0041 |

OTHER PUBLICATIONS

Written Opinion issued in International Application No. PCT/JP2018/029986, mailed on Oct. 30, 2018 (3 pages).
3GPP TS 36.211 V15.2.0, Release 15; "3rd Generation Partnership Project; Technical Specification Group Radio Access Network; Evolved Universal Terrestrial Radio Access (E-UTRA); Physical channels and modulation;" Jun. 2018; Sophia Antipolis Valbonne, France (236 pages).
3GPP TR 22.886 V15.1.0, Release 15; "3rd Generation Partnership Project; Technical Specification Group Services and System Aspects; Study on enhancement of 3GPP Support for 5G V2X Services;" Mar. 2017; Sophia Antipolis Valbonne, France (58 pages).
3GPP TSG-RAN WG1 Meeting #74bis; R1-134307; "Control Channel Design for D2D communication;" ZTE; Oct. 7-11, 2013; Guangzhou, China (5 pages).
Office Action in counterpart Japanese Patent Application No. 2020-535444 issued on May 17, 2022 (6 pages).
Samsung; "Discussions on ID(s) in SA"; 3GPP TSG RAN WG1 #78, R1-143077; Dresden, Germany; Aug. 18-22, 2014 (4 pages).
Samsung; "Identifier in scheduling assignment for D2D communication"; 3GPP TSG RAN WG1 #77, R1-142107; Seoul, South Korea; May 19-23, 2014 (4 pages).
H. Huawei; "Design of D2D BSR and D2D MAC PDU"; 3GPP TSG RAN WG2 Meeting #86, R2-142228; Seoul, Korea; May 19-23, 2014 (7 pages).
ITRI; "On Address Presentation in D2D Communication"; 3GPP TSG RAN2 Meeting #86, R2-142119; Seoul, South Korea; May 19-23, 2014 (5 pages).
ZTE; "MAC PDU format for D2D communication"; 3GPP TSG-RAN WG2 Meeting #85bis, R2-141491; Valencia, Spain; Mar. 31-Apr. 4, 2014 (4 pages).
NEC "Cell specific RNTI for scrambling codes for D2D purpose"; 3GPP TSG-RAN2 Meeting #85, R2-140093; Prague, Czech Republic; Feb. 10-14, 2014 (4 pages).
Ericsson; "On Scrambling of D2D Physical Channels"; 3GPP TSG RAN WG1 Meeting #76bis, R1-141382; Shenzhen, China; Mar. 31-Apr. 4, 2014 (4 pages).
Samsung; "Physical channel design for D2D communication"; 3GPP TSG RAN WG1 Meeting #76, R1-140388; Prague, Czech Republic; Feb. 10-14, 2014 (4 pages).
Extended European Search Report issued in European Application No. 18929568.6 mailed on Apr. 13, 2022 (9 pages).
ETRI, "Misalignment of Layer 2 ID for D2D communication", 3GPP TSG-RAN WG2 #87, R2-143583, Dresden, Germany, Aug. 18-22, 2014 (3 pages).
MediaTek, Inc., "Indicate the cast mode for packet reception", 3GPP TSG-RAN WG2 Meeting #106, R2-1906814, Reno, USA, May 13-17, 2019, (3 pages).
Office Action in counterpart Japanese Patent Application No. 2020-535444 issued on Aug. 9, 2022 (6 pages).
Office Action issued in counterpart Chinese Patent Application No. 201880096262.9 mailed on Sep. 29, 2023 (18 pages).

* cited by examiner

TERMINAL AND COMMUNICATION METHOD FOR INTER-DEVICE DIRECT COMMUNICATION

TECHNICAL FIELD

The present invention relates to a user equipment in a radio communication system.

BACKGROUND ART

For Long Term Evolution (LTE) and successor systems to LTE (for example, LTE Advanced (LTE-A), New Radio (NR) (also referred to as 5G)), a device-to-device (D2D) technique has been studied in which units of user equipment directly communicate with each other without going through a base station apparatus (e.g., Non-Patent Document 1).

D2D reduces traffic between user equipment and a base station apparatus and allows units of user equipment to communicate with each other even if a base station apparatus becomes unable to communicate due to a disaster or the like. Although D2D is referred to as a "sidelink" in the 3rd generation partnership project (3GPP), the term D2D is used herein since it is more commonly used. However, in the below-described embodiments, the term sidelink is also used as needed.

D2D communications can be broadly divided into D2D discovery (which may also be referred to as D2D discovery, D2D detection) for detecting any other user equipment capable of communicating and D2D communication (which may also be referred to as D2D direct communication, D2D communication, and inter-device direction communication) for performing direct communication between units of user equipment. In the following, when D2D communication and D2D discovery are not particularly distinguished from each other, the term D2D is simply used. Furthermore, signals transmitted and received through D2D are referred to as D2D signals. Various use cases of services of vehicle to everything (V2X) in NR have been studied (e.g., Non-Patent Document 2).

RELATED-ART DOCUMENTS

Non-Patent Document

Non-Patent Document 1: 3GPP TS 36.211 V15.2.0 (2018-06)
Non-Patent Document 2: 3GPP TR 22.886 V15.1.0 (2017-03)

SUMMARY OF THE INVENTION

Problem to be Solved by the Invention

In V2X, D2D communication is assumed in which unicast, groupcast (which may be referred to as "multicast"), and broadcast are performed. However, in a conventional D2D communication, it is difficult to determine whether a transmission type of a communication is unicast, groupcast, or broadcast until packet decoding succeeds at a higher layer.

The present invention has been accomplished in view of the above-described point, and an object is to determine, in an inter-terminal direct communication, whether a method is used in which transmission to a single terminal is performed; a method is used in which transmission to a plurality of specific terminals is performed; or a method is used in which transmission to a plurality of unspecified terminals is performed.

Means to Solve the Problem

According to the disclosed techniques, there is provided a user equipment including a reception unit that receives control information and data through inter-device direct communication; and a control unit that determines, based on the control information or the data, whether the inter-device direct communication is in unicast, groupcast, or broadcast.

Advantage of the Invention

According to the disclosed techniques, a determination can be made, in an inter-terminal direct communication, as to whether a method is used in which transmission to a single terminal is performed; a method is used in which transmission to a plurality of specific terminals is performed; or a method is used in which transmission to a plurality of unspecified terminals is performed.

EMBODIMENTS OF THE INVENTION

Figure 1:
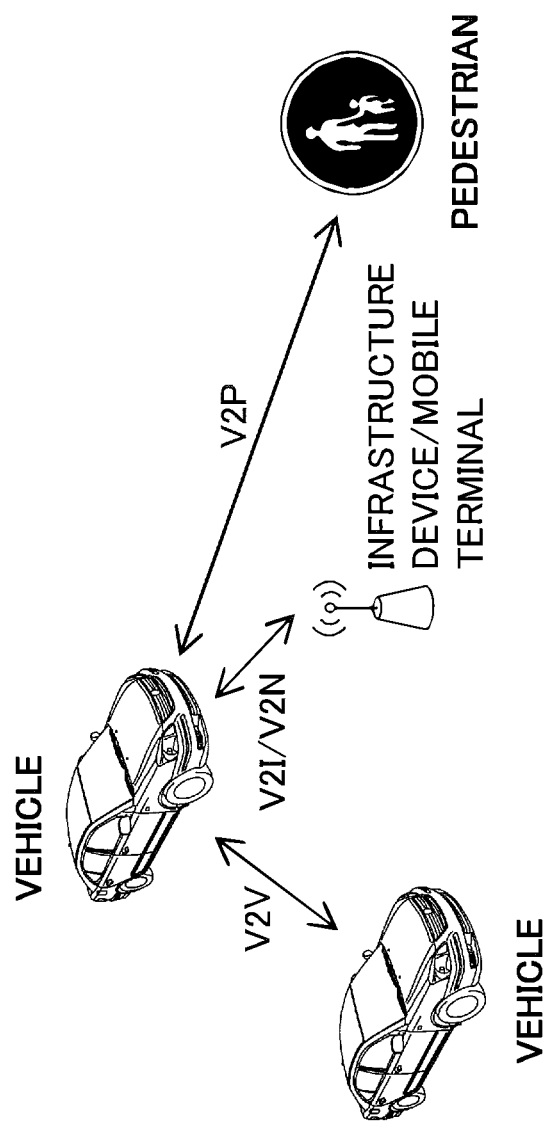
FIG. 1 is a diagram for illustrating V2X.

In the following, embodiments of the present invention are described with reference to the drawings. It should be noted that the embodiments described below are merely an example, and embodiments to which the present invention can be applied are not limited to the following embodiments.

For operations of a radio communication system in the embodiments of the present invention, an existing technique may be used as appropriate. However, the existing technique may be, but is not limited to, existing LTE, for example. Unless otherwise specified, the term "LTE" as used herein has a broad meaning including LTE-Advanced and systems subsequent to LTE-Advanced (e.g., NR).

Furthermore, in the embodiments of the present invention, a duplex method may be a time division duplex (TDD) system, a frequency division duplex (FDD) method, or any other method (e.g., flexible duplex).

Furthermore, in the following description, a method of transmitting a signal using a transmission beam may be digital beamforming in which a signal multiplied by a precoding vector (pre-coded with a precoding vector) is transmitted or may be analog beamforming in which beamforming is achieved using a variable phase shifter in a radio frequency (RF) circuit. Similarly, a method of receiving a signal using a reception beam may be digital beamforming in which a received signal is multiplied with a predetermined weighted vector or may be analog beamforming in which beamforming is achieved using a variable phase shifter in a radio frequency circuit. Hybrid beamforming as a combination of digital beamforming and analog beamforming may also be applied. Furthermore, to transmit a signal using a transmission beam may imply that a signal is transmitted with a specific antenna port. Similarly, to receive a signal using a reception beam may imply that a signal is received with a specific antenna port. An antenna port refers to a logical antenna port or a physical antenna port specified in the 3GPP specifications. Furthermore, precoding and beamforming may also be referred to as a precoder or spatial domain filter.

Methods for forming transmission and reception beams are not limited to those described above. For example, when there are a base station apparatus 10 and a user equipment 20 each having a plurality of antennas, a method of changing the angle of each antenna may be used, a combination of a method of using a precoding vector and the method of changing antenna angles may be used, different antenna panels may be switched and used, a method of using a combination of a plurality of antenna panels may be used, or any other method may be used. Furthermore, a plurality of different transmission beams may be used in a high frequency band. Using a plurality of transmission beams is referred to as a multi-beam operation and using one transmission beam is referred to as a single-beam operation.

Furthermore, in the embodiments of the present invention, "configuring" radio parameters or the like may be pre-configuring predetermined values or may be configuring radio parameters reported from the base station apparatus 10 or the user equipment 20.

FIG. 1 is a diagram for illustrating V2X. In 3GPP, implementation of V2X (Vehicle to Everything) or eV2X (enhanced V2X) by extending a D2D function has been studied, and specifications have been developed. As illustrated in FIG. 1, V2X is a part of the intelligent transport system (ITS) and is a generic term that includes vehicle to vehicle (V2V) communication indicating a communication mode between vehicles, vehicle to infrastructure (V2I) communication indicating a communication mode between a vehicle and a road-side unit (RSU) placed on a road side, vehicle to nomadic device (V2N) communication indicating a communication mode between a vehicle and a mobile terminal carried by the driver and vehicle to pedestrian (V2P) communication indicating a communication mode performed between a vehicle and a mobile terminal carried by a pedestrian.

Furthermore, at 3GPP, VSX using LTE or NR cellular communication and inter-terminal communication has been studied. It is expected that studies on LTE or NR V2X not limited to the 3GPP specifications will be carried out in the future. For example, the following are expected to be studied: ensuring interoperability; reduction of a cost for implementing a higher layer; a method of combining or switching a plurality of radio access technologies (RAT); supporting regulation of each country; retrieving and delivering data of V2X platform in LTE or NR; and a method of managing and utilizing a database.

In the embodiments of the present invention, an embodiment in which a communication device is installed in a vehicle is mainly assumed. However, the embodiments of the present invention are not limited to this embodiment. For example, the communication device may be a terminal carried by a person or the communication device may be a device that is installed in a drone or plane. The communication device may also be a base station, a RSU, a relay node or the like.

It should be noted that sidelink (SL) may be distinguished from uplink (UL) or downlink (DL) based on any one of or a combination of 1) to 4) below. Furthermore, a different name may be used for SL.

1) A resource allocation in a time domain.
2) A resource allocation in a frequency domain.
3) A synchronization signal (including sidelink synchronization signal (SLSS)) to be referred to.
4) A reference signal used in pass-loss measurement for transmission power control.

As orthogonal frequency division multiplexing (OFDM) in SL or UL, any one of cyclic-prefix OFDM (CP-OFDM), discrete Fourier transform-spread-OFDM (DFT-S-OFDM), OFDM without transform precoding, or OFDM with transform precoding may be applied.

In LTE SL, Mode 3 and Mode 4 are specified for allocation of SL resources to the user equipment 20. In Mode 3, transmission resources are allocated dynamically based on downlink control information (DCI) sent from the base station apparatus 10 to the user equipment 20. Furthermore, in Mode 3, semi-persistent scheduling (SPS) is also possible. In Mode 4, the user equipment 20 autonomously selects a transmission resource from a resource pool.

Figure 2:
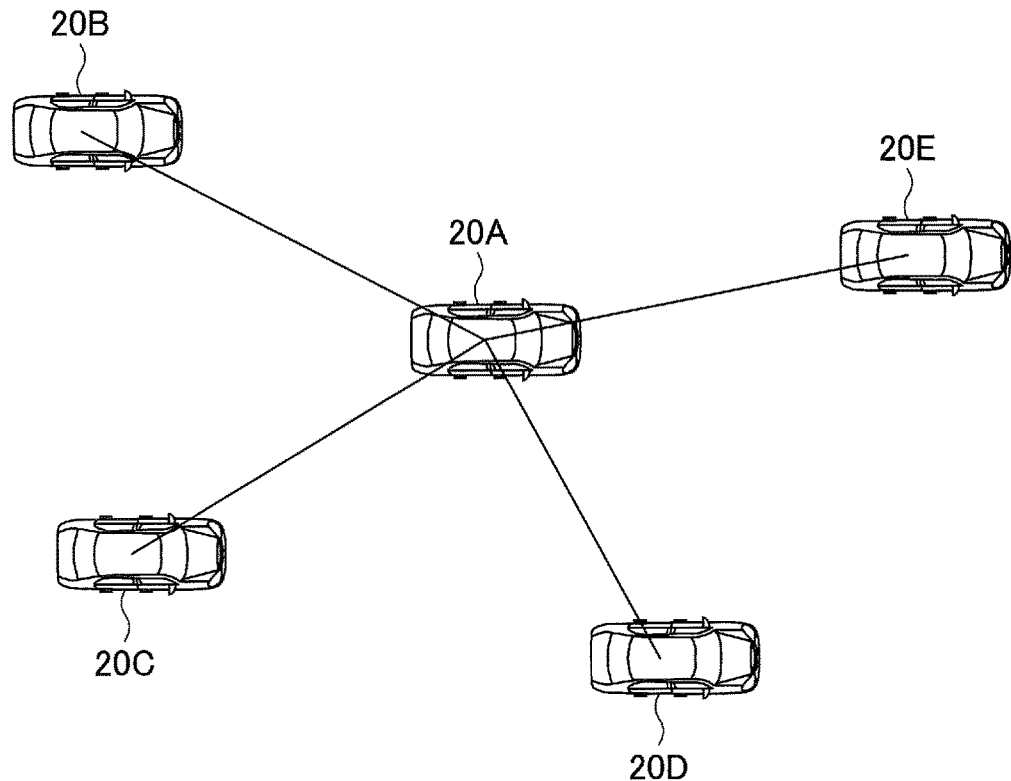
FIG. 2 is a diagram for illustrating a radio communication system in an embodiment of the present invention.

FIG. 2 is a diagram illustrating an example of a radio communication system in the embodiment of the present invention. With reference to FIG. 2, an example is illustrated in which a radio communication system includes five units of user equipment 20A, 20B, 20C, 20D, and 20E that perform D2D communication with each other. The user equipment 20A can perform D2D communication with any one of the user equipment 20B, 20C, 20D or 20E in unicast. Furthermore, when, for example, the units of user equipment 20B and 20C form a group, the user equipment 20A can perform D2D communication with the units of user equipment 20B and 20C in groupcast. In groupcast transmission, the user equipment 20A may or may not be included in the group. Furthermore, the user equipment 20A can perform D2D communication with all the units of user equipment 20B, 20C, 20D, and 20E in broadcast. Here, a transmission type may represent any one of unicast, groupcast, and broadcast.

Figure 3:
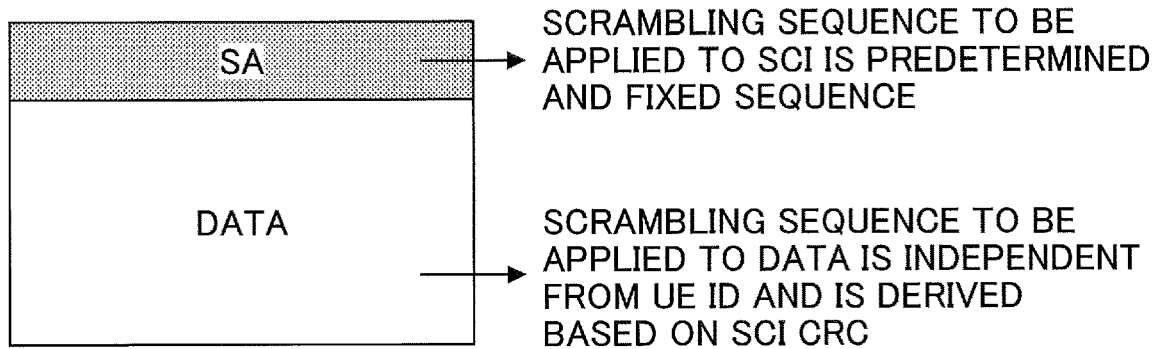
FIG. 3 is a diagram for illustrating an example of sidelink transmission.

FIG. 3 is a diagram for illustrating an example of sidelink transmission. In V2X using LTE release 14 or 15, only broadcast traffic is expected in a PHY layer. Furthermore, in V2X using LTE release 14 or 15, sidelink control information (SCI), which is transmitted through a physical sidelink control channel (PSCCH), is transmitted at a timing that is the same as a timing at which data is transmitted through an associated physical sidelink shared channel (PSSCH). A timing may be a slot, a subframe or a transmission time interval (TTI), for example.

Here, as illustrated in FIG. 3, a scrambling sequence applied to SCI included in a scheduling assignment (SA) transmitted through PSCCH is a predetermined and fixed sequence. Furthermore, a scrambling sequence applied to data that is scheduled with the SA is derived based on a cyclic redundancy check (CRC) of SCI, and is independent from an ID for identifying a user equipment (UE). SA may also be referred to as SL-Scheduling Grant.

From a perspective of the user equipment 20 as a receiving end, a PSCCH is blindly decoded. With SCI obtained by blindly decoding a PSCCH, an associated PSSCH is decoded. In order to reduce the complexity of blind-decoding, a scrambling sequence applied to SCI is a fixed sequence specified by a specification. In contrast, a scrambling sequence applied to data is derived from a CRC of SCI, and is independent from an ID for identifying UE.

Furthermore, in NR V2X, a key performance indicator (KPI) associated with a transmission speed or delay is required to be met at a high level. Furthermore, NR V2X may support unicast, groupcast, and broadcast.

Here, when a method used in LTE V2X for scrambling SCI and data is used in NR V2X, it is difficult to determine whether the transmission type is unicast, groupcast, or broadcast until packet decoding at a higher layer succeeds. Thus, in unicast or groupcast, a problem may arise with the quality of service (Qos) management of a lower layer link level, for example, hybrid automatic repeat request (HARQ) feedback, closed-loop power control, channel state information (CSI) reporting or the like. Thus, it is desired to determine at a lower layer, such as a PHY layer, whether the transmission type is unicast, groupcast, or broadcast.

Figure 4:
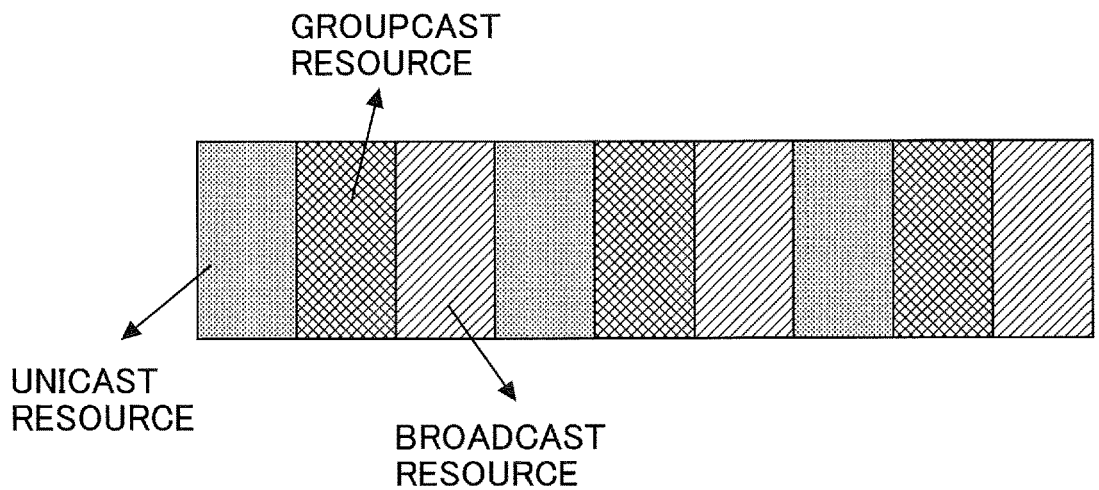
FIG. 4 is a diagram for illustrating an example of scheduling.

FIG. 4 is a diagram for illustrating an example of scheduling. As illustrated in FIG. 4, to determine whether the transmission type is unicast, groupcast, or broadcast, there is a method of allocating, in PSCCH, PSSCH or physical sidelink discovery channel (PSDCH), a resource dedicated to the transmission type. That is, in unicast, groupcast, or broadcast, a dedicated resource is used for transmission.

As another method, there is a method of determining a transmission type by SCI or data to be decoded, while using a common resource configuration in which a PSCCH or a PSSCH is allocated regardless of whether a transmission type is unicast, groupcast, or broadcast. In this method, pre-allocation of a dedicated resource depending on a transmission type is not required, and flexible scheduling is allowed by sharing a resource among the transmission types.

Figure 5:
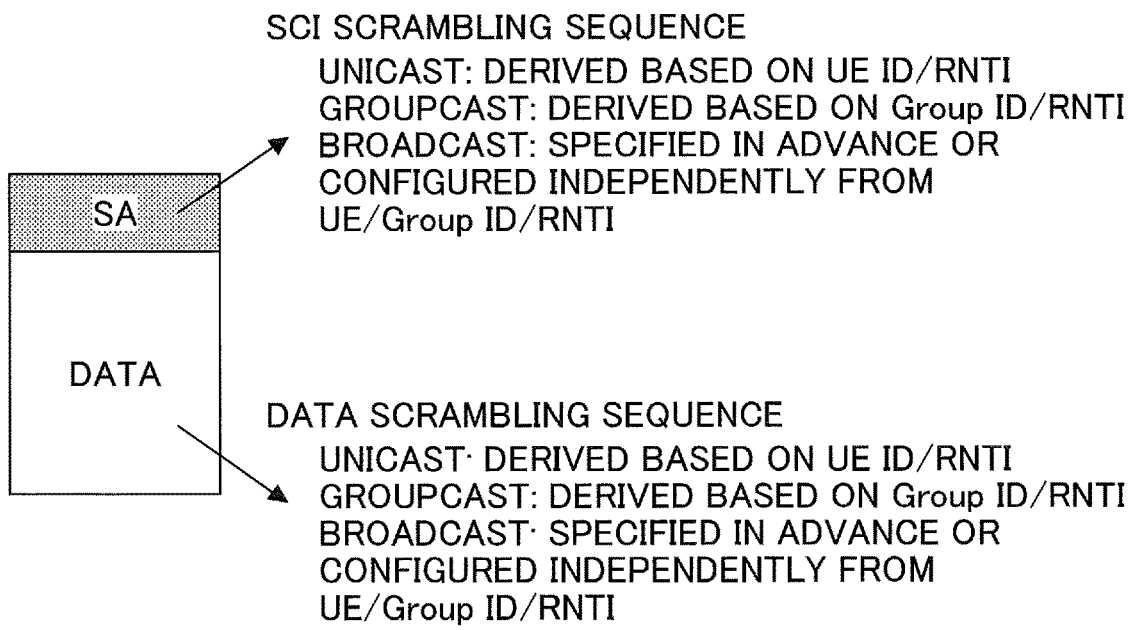
FIG. 5 is a diagram for illustrating Example (1) of sidelink transmission in an embodiment of the present invention.

FIG. 5 is a diagram for illustrating Example (1) of sidelink transmission in an embodiment of the present invention. An example of sidelink transmission is described in which a transmission type is determined by SCI or data to be decoded.

As illustrated in FIG. 5, when the transmission type is unicast, a SCI scrambling sequence for performing SA is derived based on an UE ID or a radio network temporary identifier (RNTI) of UE that receives or transmits SCI. When the transmission type is groupcast, a SCI scrambling sequence for performing SA is derived based on an UE ID or a RNTI or a group ID or RNTI of UE that transmits SCI. When the transmission type is broadcast, a SCI scrambling sequence for performing SA is specified in advance or configured independently from an UE ID or RNTI or a group ID or RNTI. It should be noted that in each of unicast, group-cast, and broadcast, a scrambling sequence may be configured with a higher layer signal (e.g., MAC, RRC). For example, a scrambling sequence may be configured per UE, group, and/or cell or a scrambling sequence may be configured per unicast, groupcast, and broadcast.

Furthermore, as illustrated in FIG. 5, when the transmission type is unicast, a data scrambling sequence is derived based on an UE ID or a RNTI of UE that receives or transmits data. When the transmission type is groupcast, a data scrambling sequence is derived based on an UE ID or a RNTI or a group ID or a RNTI of UE that transmits data. In each of unicast and groupcast, a scrambling sequence may be specified per UE and/or group with a higher layer signal (e.g., MAC, RRC). When the transmission type is broadcast, a data scrambling sequence is predefined or configured independently from an UE ID or a RNTI or a group ID or a RNTI. Furthermore, a data scrambling sequence and a CSI scrambling sequence may be a common sequence. A data scrambling sequence may be a sequence derived from a SCI scrambling sequence or from information (such as UE ID, group ID) included in SCI. It should be noted that in each of unicast, groupcast, and broadcast, a scrambling sequence may be configured with a higher layer signal (e.g., MAC, RRC). For example, a scrambling sequence may be configured per UE, group or cell or a scrambling sequence may be configured per unicast, groupcast, and broadcast.

Figure 6:
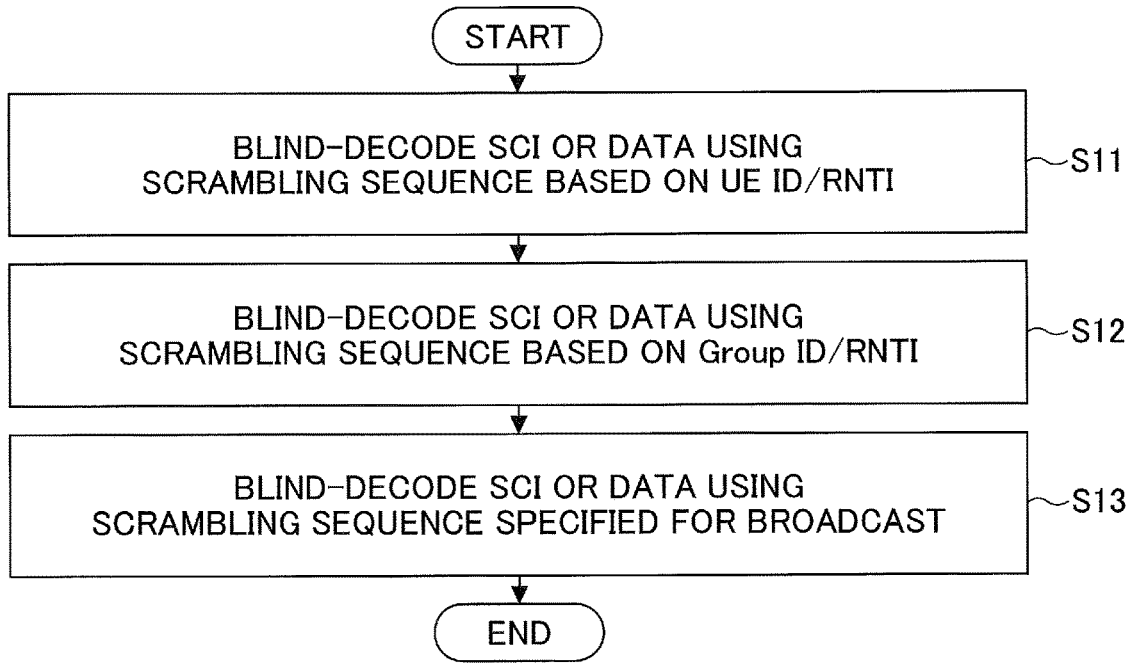
FIG. 6 is a flowchart for illustrating Example (1) of sidelink reception in an embodiment of the present invention.

FIG. 6 is a flowchart for illustrating Example (1) of sidelink reception in an embodiment of the present invention. An operation is described in which the sidelink transmission illustrated in FIG. 5 is received by the user equipment 20.

At step S11, the user equipment 20 performs blind-decoding of SCI or data by using a scrambling sequence derived based on an UE ID or a RNTI. When the blind-decoding is successful, the user equipment 20 can determine that received SCI and data have been unicasted and can determine the address. Here, when SCI and data have been scrambled using the same scrambling sequence, the user equipment 20 can decode data using the scrambling sequence with which blind-decoding of the SCI has been successful.

At step S12, the user equipment 20 performs blind-decoding of SCI or data by using a scrambling sequence derived based on a group ID or a RNTI. When the blind-decoding is successful, the user equipment 20 can determine that received SCI and data have been groupcasted and can determine the address. Here, similar to the case of unicast, when SCI and data have been scrambled using the same scrambling sequence, the user equipment 20 can decode data using the scrambling sequence with which blind-decoding of the SCI has been successful.

At step S13, the user equipment 20 executes blind-decoding of SCI or data with a scrambling sequence that is specified or configured for broadcast and that is independent from a UE ID or a group ID/RNTI. When the blind-decoding is successful, the user equipment 20 can determine that received SCI and data are broadcasted. Here, similar to the case of unicast, when SCI and data are scrambled using the same scrambling sequence, the user equipment 20 can decode data using the scrambling sequence with which blind-decoding of the SCI has been successful.

It should be noted that any of step S11, S12, and S13 may be performed first or that they may be performed in any order. The priority of the respective steps may be specified in a specification or may be set by a base station.

Figure 7:
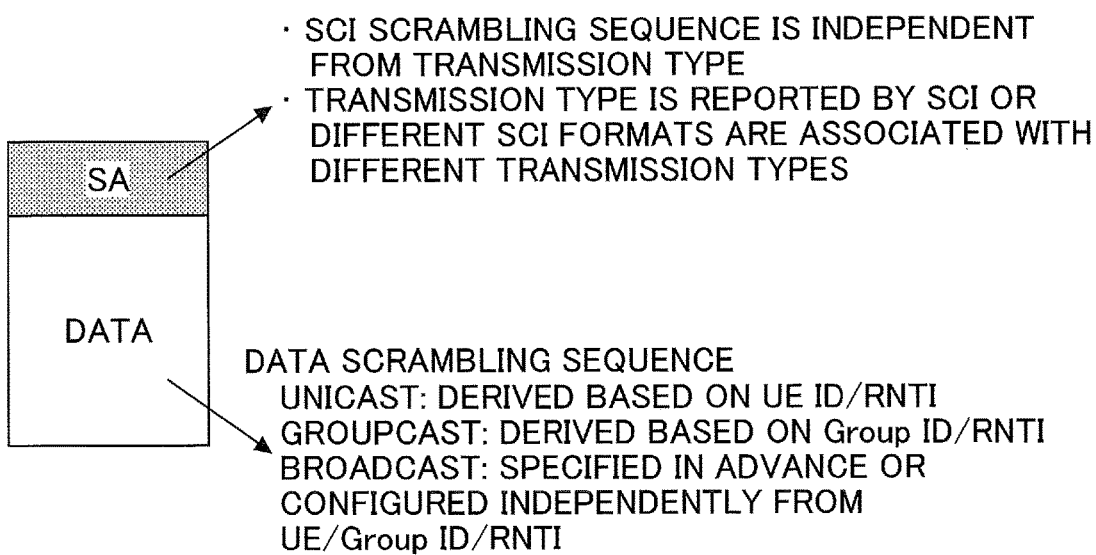
FIG. 7 is a diagram for illustrating Example (2) of sidelink transmission in an embodiment of the present invention.

FIG. 7 is a diagram for illustrating Example (2) of sidelink transmission in an embodiment of the present invention. An example of sidelink transmission is described in which a method of determining a transmission type by SCI or data to be decoded is used.

As illustrated in FIG. 7, an SCI scrambling sequence for performing SA is predefined or configured independently from a transmission type. A transmission type may be reported by SCI. Furthermore, different SCI formats may be associated with different transmission types, respectively, and a transmission type may be determined based on a SCI format. A transmission type may be determined based on information included in SCI (e.g., modulation coding scheme (MCS), rank indicator (RI)). For example, for a higher order modulation method or for performing multi-layer transmission, Qos control is required. Accordingly, upon detecting that MCS, RI or the like is higher than or equal to a certain value, a transmission type is determined to be a transmission type for which QoS control is performed (e.g., unicast, groupcast).

Furthermore, as illustrated in FIG. 7, when the transmission type is unicast, a data scrambling sequence is derived based on an UE ID or a RNTI of a UE that receives or transmits data. When the transmission type is groupcast, a data scrambling sequence is derived based on an UE ID or a RNTI of a UE that transmits data, and/or a group ID or RNTI. When the transmission type is broadcast, a data scrambling sequence is predefined or configured independently from an ID of a UE or a Group, or RNTI. It should be noted that, in each of unicast, groupcast, and broadcast, a scrambling sequence may be configured with a higher layer signal (e.g., MAC, RRC). For example, a scrambling sequence may be configured per UE, group or cell or a scrambling sequence may be configured per unicast, groupcast, and broadcast.

Figure 8:
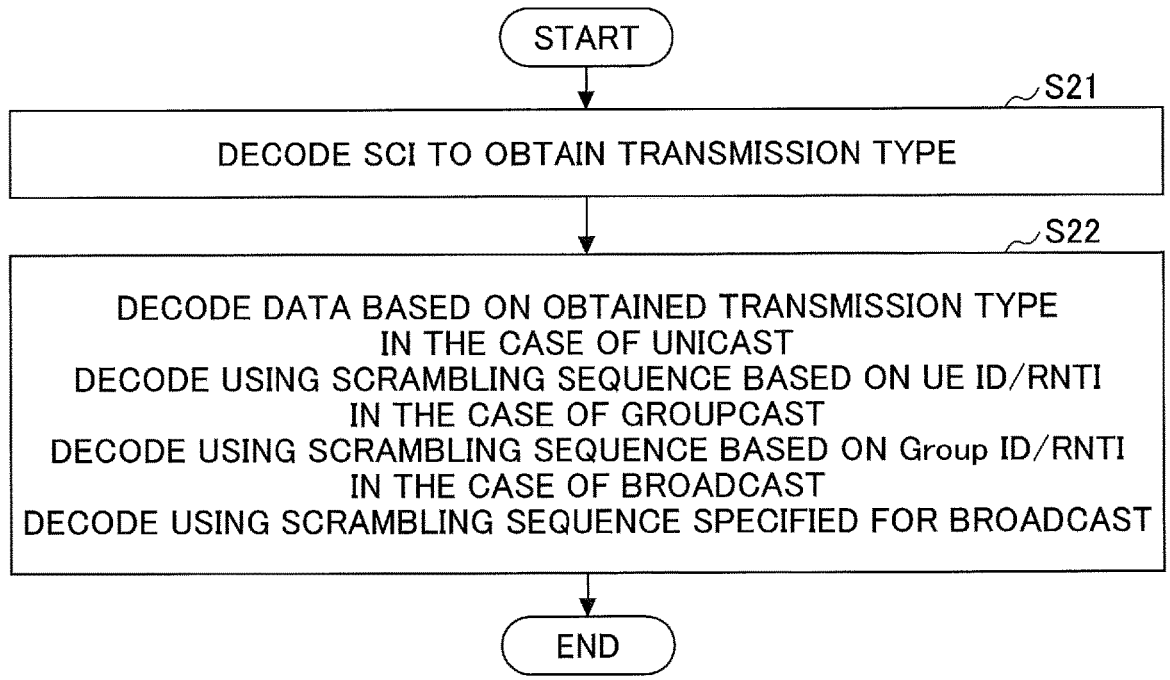
FIG. 8 is a flowchart for illustrating Example (2) of sidelink reception in an embodiment of the present invention.

FIG. 8 is a flowchart for illustrating Example (2) of sidelink reception in an embodiment of the present invention. An operation is described in which the user equipment 20 receives the sidelink transmission illustrated in FIG. 7.

At step S21, the user equipment 20 decodes SCI and obtains a transmission type. Alternatively, the user equipment 20 obtains a transmission type based on an SCI format or other information included in SCI.

At step S22, when the transmission type obtained at step S21 is unicast, the user equipment 20 performs decoding of data with a scrambling sequence based on an UE ID or a RNTI. When the transmission type obtained at step S21 is groupcast, the user equipment 20 performs decoding of data with a scrambling sequence based on a group ID or RNTI. When the transmission type obtained at step S21 is broadcast, the user equipment 20 performs decoding of SCI or data with a scrambling sequence that is specified or configured for broadcast and that is independent from a UE ID, a group ID, or a RNTI.

Figure 9:
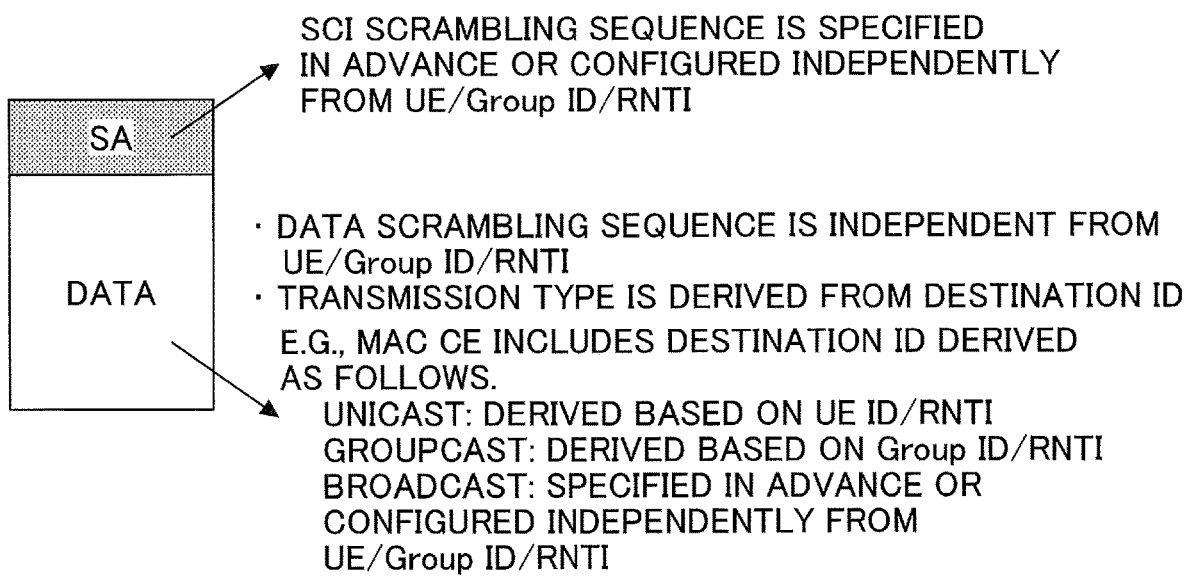
FIG. 9 is a diagram for illustrating Example (3) of sidelink transmission in an embodiment of the present invention.

FIG. 9 is a diagram for illustrating Example (3) of sidelink transmission in an embodiment of the present invention. An example of sidelink transmission is described in which a method of determining a transmission type by SCI or data to be decoded is used.

As illustrated in FIG. 9, an SCI scrambling sequence for performing SA is predefined or configured independently from an UE ID or group ID or RNTI. A data scrambling sequence is configured independently from an UE ID or group ID or RNTI. A transmission type may be determined based on a destination ID included in a media access control (MAC) control element (CE). When the transmission type included in the MAC CE is unicast, the destination ID may be derived based on an UE ID or a RNTI. When the transmission type is groupcast, the destination ID may be derived based on a group ID or a RNTI. When the transmission type is broadcast, the destination ID may be predefined or configured independently from an UE ID or group ID or RNTI.

Figure 10:
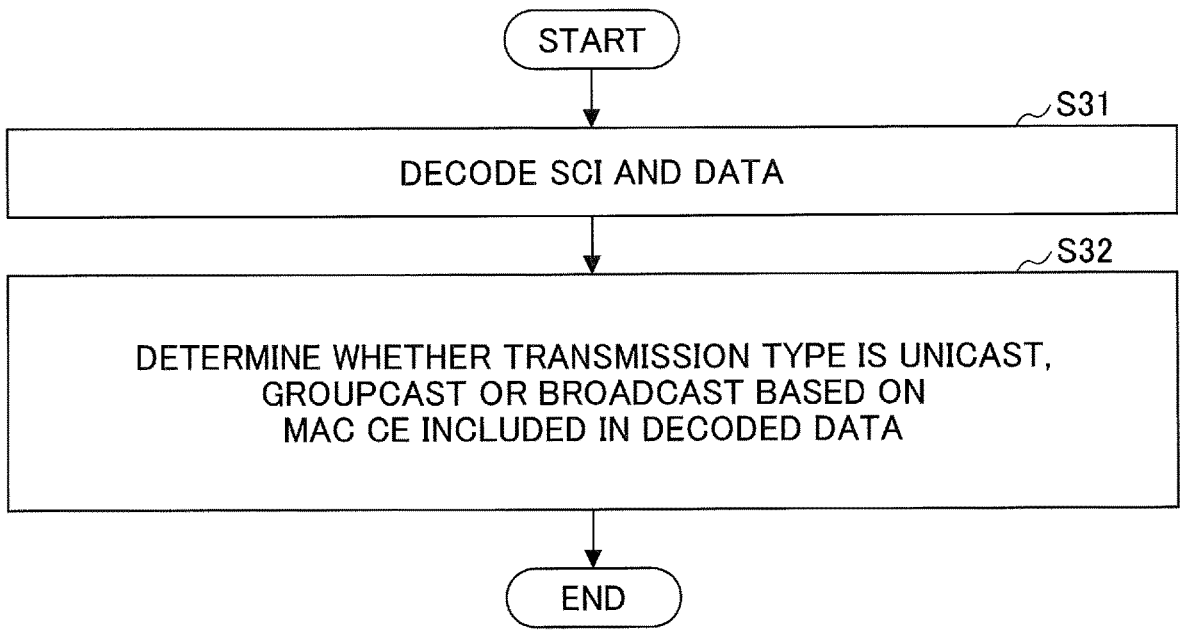
FIG. 10 is a flowchart for illustrating Example (3) of sidelink reception in an embodiment of the present invention.

FIG. 10 is a flowchart for illustrating Example (3) of sidelink reception in an embodiment of the present invention. An operation is described in which the sidelink transmission illustrated in FIG. 9 is received by the user equipment 20.

At step S31, the user equipment 20 decodes SCI and data. Subsequently, at step S32, a determination is made as to whether a transmission type is unicast, groupcast, or broadcast based on a MAC CE included in the decoded data.

Note that, for a method of pre-allocating a dedicated resource for each transmission type in a PSCCH, a PSSCH, or a PSDCH (Physical Sidelink Discovery Channel), any of the scrambling sequences for SCI and data described with reference FIGS. 5, 7, 9 and FIGS. 6, 8, 10 may be applied.

The user equipment 20 may monitor a resource dedicated for unicast in which a PSCCH, a PSSCH, or a PSDCH is allocated, while assuming a scrambling sequence based on a UE ID or a RNTI. For example, an UE ID or RNTI may be an ID or RNTI of destination UE.

The user equipment 20 may monitor a resource dedicated for groupcast in which a PSCCH, a PSSCH, or a PSDCH is allocated, while assuming a scrambling sequence based on a group ID or a RNTI.

The user equipment 20 may monitor a resource dedicated for broadcast in which a PSCCH, PSSCH, or a PSDCH is arranged, while assuming a scrambling sequence that is independent from a UE ID, a group ID, or a RNTI. For example, a scrambling sequence used in LTE release 14 may be assumed.

According to the above-described embodiments, the user equipment 20 can determine at a lower layer, for example, at a PHY layer, whether a sidelink communication is unicast, groupcast, or broadcast. Accordingly, the user equipment 20 can appropriately perform Qos management at a lower layer link level, for example, HARQ feedback, closed-loop power control, CSI feedback or the like.

That is, in an inter-device direct communication, it is possible to determine whether a method is a method is which transmission to a single terminal is performed, a method in which transmission to a plurality of specific terminals is performed, or a method in which transmission to a plurality of unspecific terminals.

(Device Configuration)

Next, exemplary functional configurations of a base station apparatus 10 and a user equipment 20 that perform the explained processes and operations are described. However, the base station apparatus 10 and the user equipment 20 may each have only part of the functions in the Examples.

<Base Station Apparatus 10>

Figure 11:
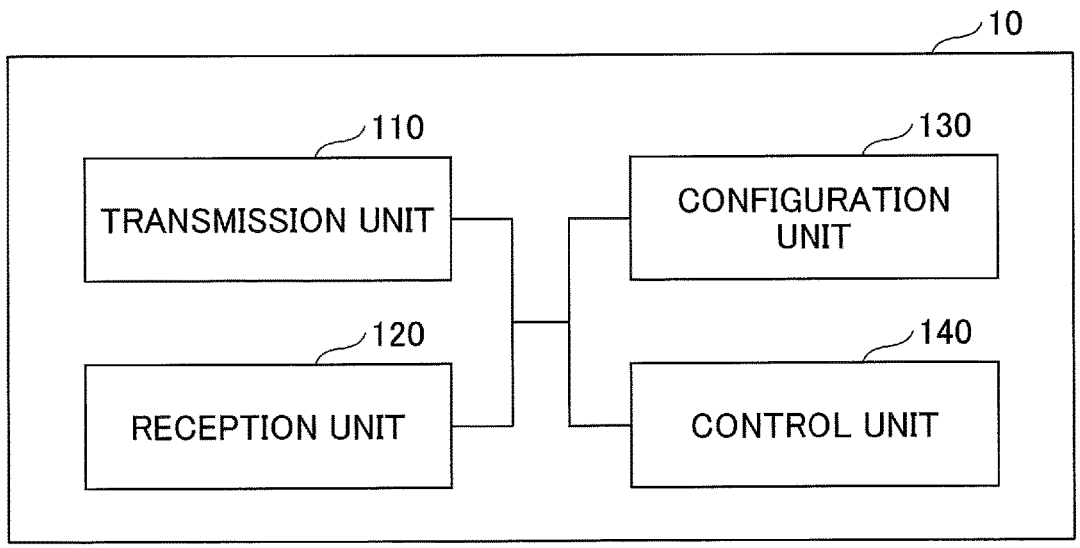
FIG. 11 is a diagram for illustrating an example of a functional configuration of a base station apparatus 10 in an embodiment of the present invention.

FIG. 11 is a diagram illustrating an exemplary functional configuration of the base station apparatus 10. As illustrated in FIG. 11, the base station apparatus 10 has a transmission unit 110, a reception unit 120, a configuration unit 130, and a control unit 140. The functional configuration illustrated in FIG. 11 is merely an example. Any functional division or any name may be used as long as the operations according to the embodiment of the present invention can be performed.

The transmission unit 110 includes a function of generating a signal to be sent to the user equipment 20 and sending the signal wirelessly. The reception unit 120 includes a function of receiving a variety of signals sent from the user equipment 20 and acquiring information from the received signals, for example, information on higher layers. Furthermore, the transmission unit 110 has a function of sending, for example, NR-PSS, NR-SSS, NR-PBCH, DL/UL control signals to the user equipment 20. Furthermore, the transmission unit 110 sends information indicating that other terminal is approaching the user equipment 20 and the reception unit 120 receives terminal information from the user equipment 20.

The configuration unit 130 stores in a memory pre-configured configuration information and various pieces of configuration information to be sent to the user equipment 20, and reads the stored information from the memory as needed. The contents of the configuration information include information associated with configurations of D2D communication.

As described in the embodiments, the control unit 140 performs a process associated with configuration for allowing the user equipment 20 to perform D2D communication. The functional unit of the control unit 140 associated with signal transmission may be included in the transmission unit 110, and the functional unit of the control unit 140 associated with signal reception may be included in the reception unit 120.

<User Equipment 20>

Figure 12:
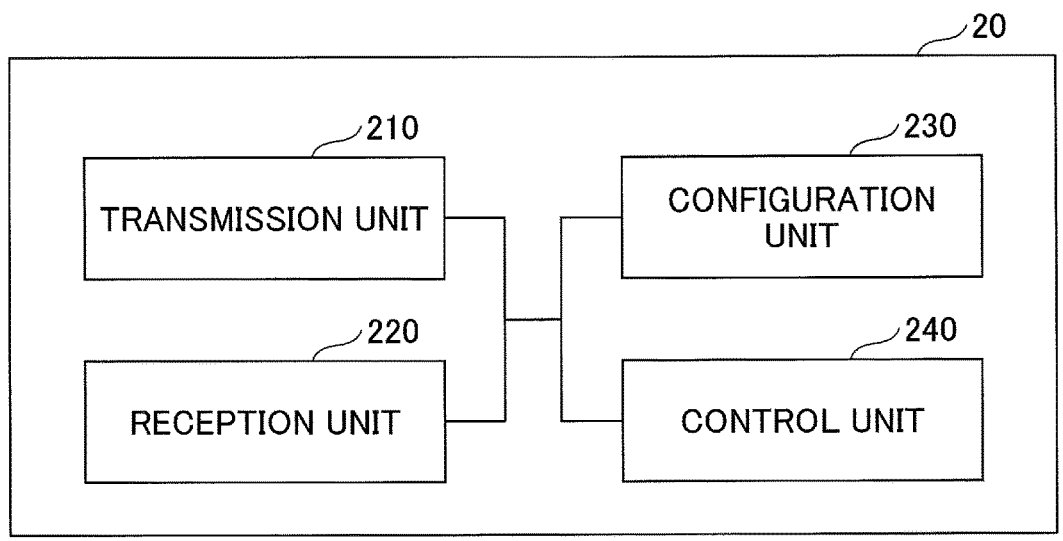
FIG. 12 is a diagram for illustrating an example of a functional configuration of a user equipment 20 in an embodiment of the present invention.

FIG. 12 is a diagram illustrating an exemplary functional configuration of the user equipment 20. As illustrated in FIG. 12, the user equipment 20 has a transmission unit 210, a reception unit 220, a configuration unit 230 and a control unit 240. The functional configuration illustrated in FIG. 12 is merely an example. Any functional division or any name may be used as long as the operations according to the embodiment of the present invention can be performed.

The transmission unit 210 creates a transmission signal from transmission data and sends the transmission signal wirelessly. The reception unit 220 receives a variety of signals wirelessly, and obtains from the received physical layer signal, for example, a higher layer signal. Furthermore, the reception unit 220 has a function of receiving NR-PSS, NR-SSS, NR-PBCH, DL/UL/SL control signals transmitted from the base station apparatus 10. Furthermore, the transmission unit 210 sends, as a D2D communication, to other user equipment 20 a physical sidelink control channel (PSCCH), physical sidelink shared channel (PSSCH), physical sidelink discovery channel (PSDCH), physical sidelink broadcast channel (PSBCH) or the like and the reception unit 120 receives PSCCH, PSSCH, PSDCH, or PSBCH from other user equipment 20.

The configuration unit 230 stores in a memory various pieces of configuration information received from the base station apparatus 10 or other user equipment 20 through the reception unit 220, and reads the stored information from the memory as needed. Furthermore, the configuration unit 230 also stores pre-configured configuration information. The contents of the configuration information include, for example, information associated with configurations of D2D communication.

As described in the embodiments, the control unit 240 controls D2D communication carried out with other user equipment 20. Furthermore, the control unit 240 performs a transmission process and a reception process based on the transmission type of the D2D communication. The functional unit of the control unit 240 associated with signal transmission may be included in the transmission unit 210, and the functional unit of the control unit 240 associated with signal reception may be included in the reception unit 220.

(Hardware Configuration)

In the functional configuration diagrams (FIGS. 11 and 12) used in the description of the above embodiment of the present invention, the blocks of the functional units are illustrated. The functional blocks (configuring units) are implemented by any combination of hardware and/or software. A device of implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

Figure 13:
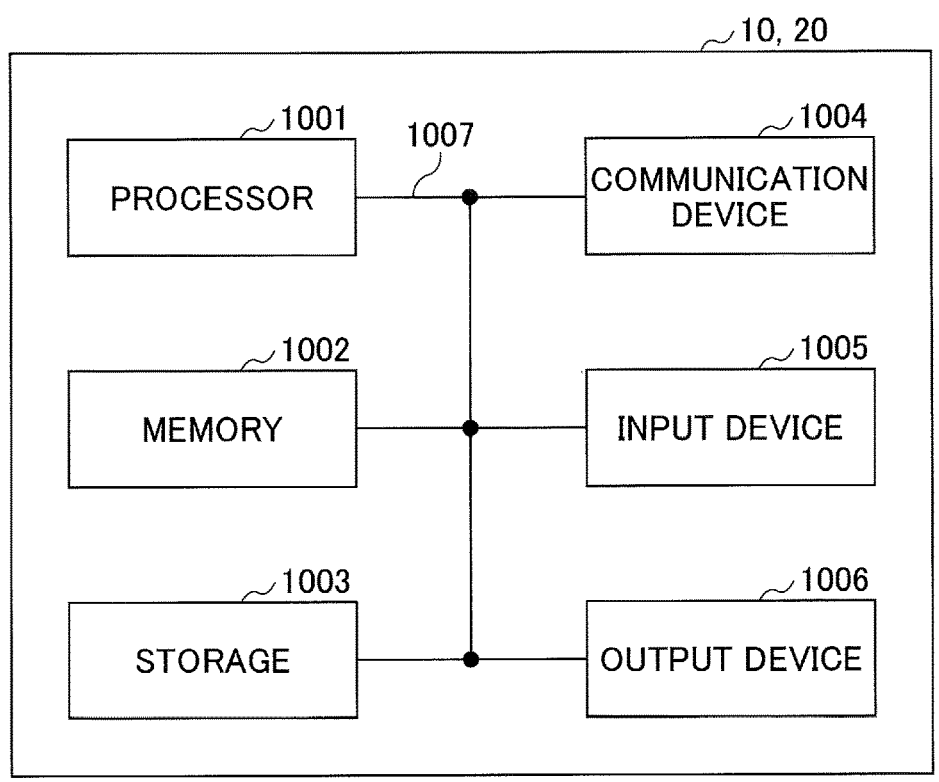
FIG. 13 is a diagram for illustrating an example of a hardware configuration of a base station apparatus 10 or a user equipment 20 in an embodiment of the present invention.

For example, each of the base station apparatus 10 and the user equipment 20 in the embodiment of the present invention may function as a computer that performs the process according to the embodiment of the present invention. FIG. 13 is a diagram illustrating an example of a hardware configuration of a communication device as the base station apparatus 10 and the user equipment 20 according to one embodiment of the present invention. Each of the base station apparatus 10 and the user equipment 20 described above may be physically configured as a computer device that includes a processor 1001, a memory 1002, a storage 1003, a communication device 1004, an input device 1005, an output device 1006, a bus 1007, and the like.

In the following description, the term "device" can be replaced with a circuit, a device, a unit, or the like. The hardware configuration of the base station apparatus 10 and the user equipment 20 may be configured to include one or more devices denoted by 1001 to 1006 illustrated in the drawing or may be configured without including some devices.

Each function in the base station apparatus 10 and the user equipment 20 is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like.

Furthermore, the processor 1001 reads a program (a program code), a software module, and data from the storage 1003 and/or the communication device 1004 out to the memory 1002, and performs various kinds of processes according to them. A program causing a computer to execute at least some of the operations described in the above embodiment is used as the program. For example, the transmission unit 110, the reception unit 120, the configuration unit 130, and the control unit 140 of the base station apparatus 10 illustrated in FIG. 11, for example, may be implemented by a control program which is stored in the memory 1002 and operates on the processor 1001. Furthermore, the transmission unit 210, the reception unit 220, the configuration unit 230, and the control unit 240 of the user equipment 20 illustrated in FIG. 12, for example, may be implemented by a control program which is stored in the memory 1002 and operates on the processor 1001. Various types of processes are described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), etc. The memory 1002 is also referred to as a "register," a "cache," a "main memory," or the like. The memory 1002 can store programs (program codes), software modules, or the like which are executable for carrying out the process according to an embodiment of the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transmitting and receiving device) for performing communication between computers via a wired and/or wireless network and is also referred to as a network device, a network controller, a network card, a communication module, or the like. For example, the transmission unit 110 and the reception unit 120 of the base station apparatus 10 may be implemented by the communication device 1004. Furthermore, the transmission unit 210 and the reception unit 220 of the user equipment 20 may be implemented by the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrated (for example, a touch panel).

The devices, such as the processor 1001 and the memory 1002, may be connected via the bus 1007 to communicate information with each other. The bus 1007 may be configured with a single bus or may be configured with different buses between the devices.

Furthermore, each of the base station apparatus 10 and the user equipment 20 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these hardware components.

Conclusion of the Embodiments

As described above, according to the embodiments of the present invention, there is provided a user equipment including a reception unit that receives control information and data through inter-terminal direct communication; and a control unit that determines, based on the control information or the data, whether the inter-terminal direct communication is unicast, groupcast, or broadcast.

According to the above-described configuration, the user equipment 20 can determine, at a lower layer, such as a PHY layer, whether a sidelink communication is unicast, groupcast, or broadcast. Furthermore, the user equipment 20 can appropriately perform a link level QoS management at a lower layer, such as HARQ feedback, closed-loop power control, and CSI feedback. Namely, in an inter-terminal direct communication, a determination is made as to whether a method is a method in which transmission to a single terminal is performed, a method in which transmission to a plurality of specific terminals is performed, or a method in which transmission to a plurality of unspecific terminals is performed.

Upon successfully decoding the control information using a scrambling sequence based on an identifier of the user equipment, a determination may be made that the inter-terminal direct communication is the unicast; upon successfully decoding the control information using a scrambling sequence based on an identifier of a group, a determination may be made that the inter-terminal direct communication is the groupcast; and upon successfully decoding the control information using a scrambling sequence independent from the identifier of the user equipment or the identifier of the group, a determination may be made that the inter-terminal direct communication is the broadcast. According to this configuration, the user equipment 20 can determine, at a lower layer, such as a PHY layer, whether the sidelink communication is the unicast, the groupcast, or the broadcast.

The data may be decoded using the scrambling sequence with which the control information is successfully decoded. According to this configuration, the user equipment 20 can efficiently decode the data using the scrambling sequence with which SCI is successfully decoded.

The determination of whether the inter-terminal direct communication is the unicast, the groupcast, or the broadcast may be made based on: information included in the control information, the information included in the control information indicating that the inter-terminal direct communication is the unicast, the groupcast, or the broadcast; or a format of the control information. According to this configuration, the user equipment 20 can determine, at a lower layer, such as a PHY layer, whether the sidelink communication is the unicast, the groupcast, or the broadcast.

Upon determining that the inter-terminal direct communication is the unicast, the data may be decoded using a scrambling sequence based on an identifier of the user equipment; upon determining that the inter-terminal direct communication is the groupcast, the data may be decoded using a scrambling sequence based on an identifier of a group; and upon determining that the inter-terminal direction communication is the broadcast, the data may be decoded using a scrambling sequence independent from the identifier of the user equipment or the identifier of the group. According to this configuration, the user equipment 20 can select an appropriate scrambling sequence and can efficiently decode the data based on a result of the determination that the sidelink communication is the unicast, the groupcast, or the broadcast.

The determination of whether the inter-terminal direct communication is the unicast, the groupcast, or the broadcast may be made based on a media access control (MAC) control element obtained by decoding the data. According to this configuration, the user equipment 20 can determine, at a lower layer, such as a MAC layer, whether the sidelink communication is the unicast, the groupcast, or the broadcast.

Supplemental Embodiments

While embodiments of the invention have been described above, the disclosed inventions are not limited to the embodiments, but it could be understood by those skilled in the art that various modifications, corrections, alternatives, replacements, and the like can be made thereto. While specific numerical examples have been used to facilitate understanding of the invention, the numerical values are only an example and appropriate values may be used, unless otherwise specified. The sorting of articles in the above description is not essential to the invention, but details described in two or more articles may be combined for use if necessary, or details of a certain article may be applied to details described in another article (unless incompatible). The boundaries of the functional units or the processing units in the functional block diagrams cannot be said to correspond to boundaries of physical components. The operations of two or more functional units may be performed by a single physical component or the operation of a single functional unit may be performed by two or more physical components. The order of steps of the process procedure described in the present embodiment may be interchanged unless incompatible. For the sake of simplicity of the process description, the functional block diagrams have been used to describe the base station apparatus 10 and the user equipment 20. However, such devices may be implemented by hardware, software or a combination of hardware and software. Software operated by a processor included in the base station apparatus 10 according to the embodiment of the present invention and software operated by a processor included in the user equipment 20 according to the embodiment of the present invention may be stored in random access memory (RAM), flash memory, read only memory (ROM), EPROM, EEPROM, a register, hard disk drive (HDD), a removable disk, CD-ROM, database, server, or any other appropriate storage medium.

Notification of information is not limited to the aspects/embodiments described in this specification, but may be performed using other methods. For example, the notification of information may be performed physical layer signaling (such as downlink control information (DCI) or uplink control information (UCI)), higher layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing sequences, the sequences, the flowcharts and the like of the embodiment/examples described above in this specification may be changed in the order as long as they are not incompatible with each other. For example, in the method described in this specification, various steps as elements are described in an exemplary order and the method is not limited to the described order.

The certain operations described in the specification as being performed by a base station apparatus 10 may be performed by a upper node in some cases. In a network formed by one or more network nodes having a base station apparatus 10, it is clear that various operations performed for connection with a user equipment 20 could be performed by a base station apparatus 10 and/or a network node other than a base station apparatus 10. In the above, although a case of using one network node other than a base station apparatus 10 has been described as an example, a combination of a plurality other network nodes (e.g., MME and S-GW) may be used.

The aspects/embodiments described in this specification may be used alone, may be used in combination, or may be switched with implementation thereof.

The user equipment 20 may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station apparatus 10 may be referred to as a NodeB (NB), evolved NodeB (eNB), next generation NodeB (NE nodeB (gNB)), a base station or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "on the basis of ~" which is used in this specification does not refer to only "on the basis of only ~," unless apparently described. In other words, the expression "on the basis of ~" refers to both "on the basis of only ~" and "on the basis of at least ~."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

In the embodiments of the present invention, SCI is one example of control information. An UE ID or RNTI is one example of user equipment identifiers. A group ID or RNTI is one example of group identifiers. MAC CE is one example of MAC control elements.

Although the present invention is described above in detail, it is obvious to those skilled in the art that the present invention is not limited to the embodiments described in this specification. The present invention can be implemented as modifications and alterations without departing from the gist and scope of the present invention defined in claims set forth below. Accordingly, the description of this specification is intended to be exemplary and does not have any restrictive meaning to the present invention.

LIST OF REFERENCE SYMBOLS 10 base station apparatus
110 transmission unit
120 reception unit
130 configuration unit
140 control unit
20 user equipment
210 transmission unit
220 reception unit
230 configuration unit
240 control unit
1001 processor
1002 memory
1003 storage
1004 communication device
1005 input device
1006 output device

The invention claimed is:

1. A terminal for transmitting physical layer control information and data via a sidelink shared channel for inter-terminal direct communication, the terminal comprising:
   a processor that sets, from among a unicast, a groupcast, and a broadcast, the broadcast in the physical layer control information to be transmitted via the sidelink shared channel, as a cast type of the data; and
   a transmitter that transmits the physical layer control information via the sidelink shared channel and that transmits the data via the sidelink shared channel based on the cast type,
   wherein the physical layer control information transmitted via the sidelink shared channel for the inter-terminal direct communication is different from a signal of a Medium Access Control (MAC) layer,
   wherein the transmitter transmits the physical layer control information and the data at a same timing via the sidelink shared channel through a plurality of antenna ports of the terminal,
   wherein the processor associates the cast type with a format of the physical layer control information to be transmitted via the sidelink shared channel, the physical layer control information to be transmitted via the sidelink shared channel being different from the signal of the MAC layer, and
   wherein the cast type associated with the format of the physical layer control information to be transmitted via the sidelink shared channel is the broadcast.

2. The terminal according to claim 1, wherein the processor scrambles the data using a scrambling sequence for the data, and the processor sets the scrambling sequence for the data independently of the cast type.

3. A communication method executed by a terminal for transmitting physical layer control information and data via a sidelink shared channel for inter-terminal direct communication, the method comprising:
   setting, from among a unicast, a groupcast, and a broadcast, the broadcast in the physical layer control information to be transmitted via the sidelink shared channel, as a cast type of the data; and
   transmitting the physical layer control information via the sidelink shared channel and transmitting the data via the sidelink shared channel based on the cast type,
   wherein the physical layer control information transmitted via the sidelink shared channel for the inter-terminal direct communication is different from a signal of a Medium Access Control (MAC) layer,
   wherein the transmitting transmits the physical layer control information and the data at a same timing via the sidelink shared channel through a plurality of antenna ports of the terminal,
   wherein the cast type is associated with a format of the physical layer control information to be transmitted via the sidelink shared channel, the physical layer control information to be transmitted via the sidelink shared channel being different from the signal of the MAC layer, and
   wherein the cast type associated with the format of the physical layer control information to be transmitted via the sidelink shared channel is the broadcast.

* * * * *